Jan. 15, 1963     H. BROSCHKE     3,073,222
CAMERA WITH A BUILT-IN EXPOSURE METER
Filed Feb. 27, 1961     3 Sheets-Sheet 1
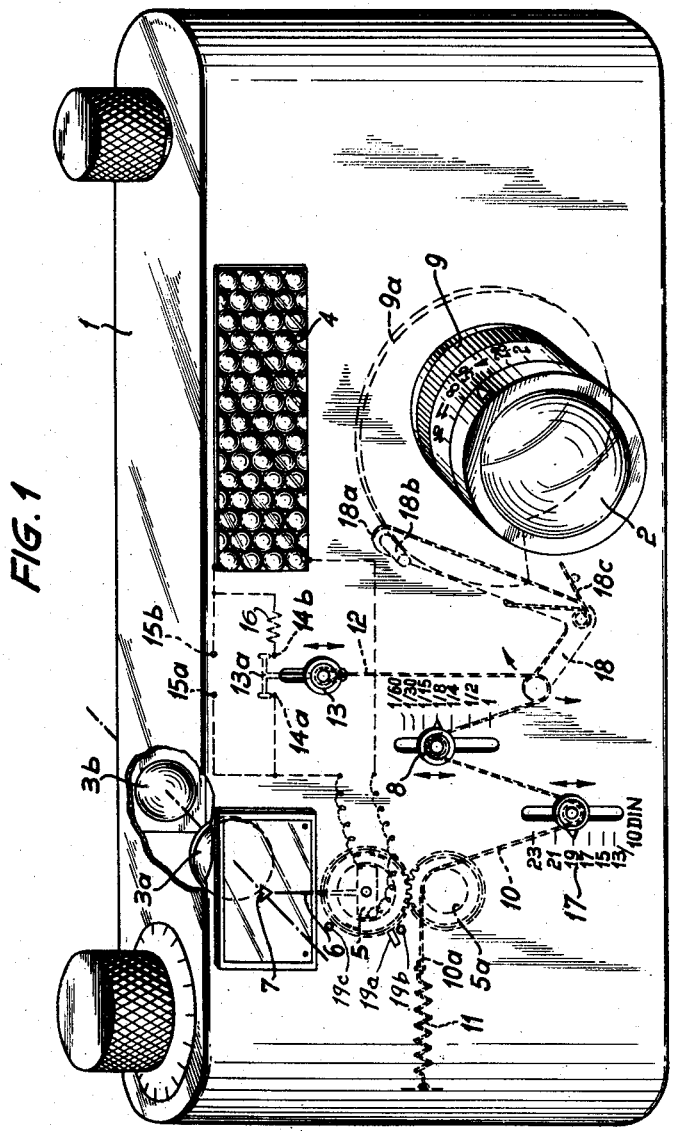
INVENTOR
HEINRICH BROSCHKE
By Toulmin & Toulmin
Attorneys

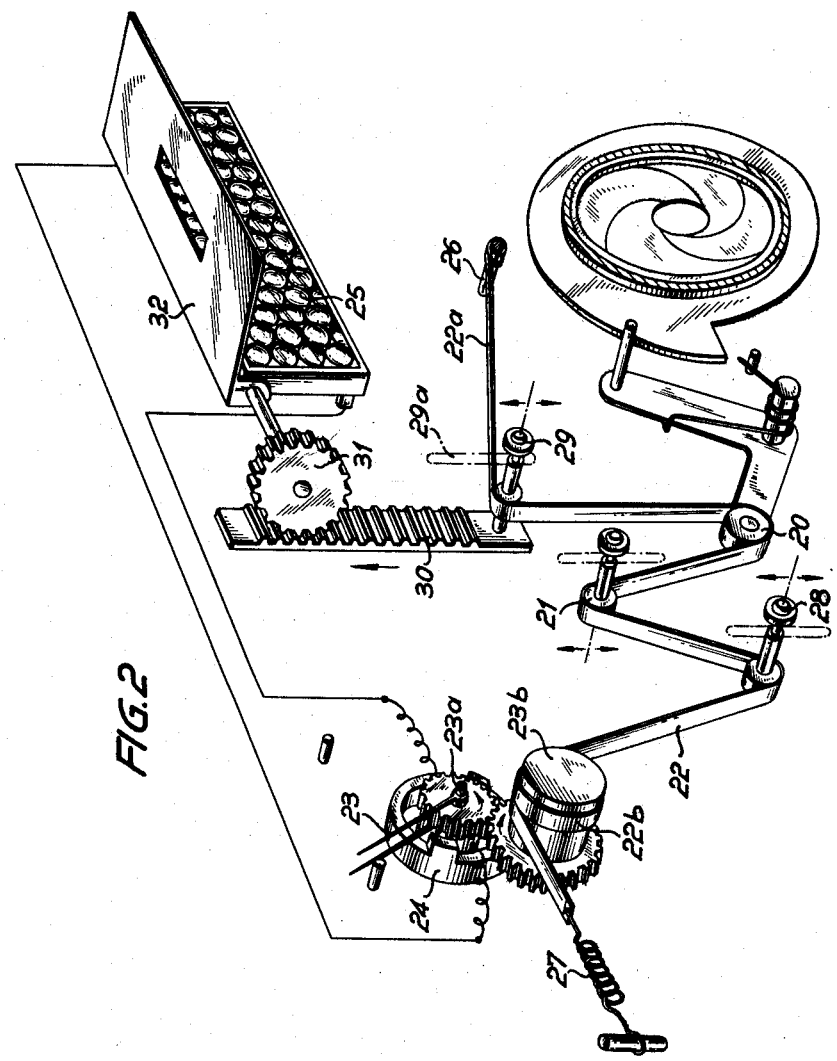

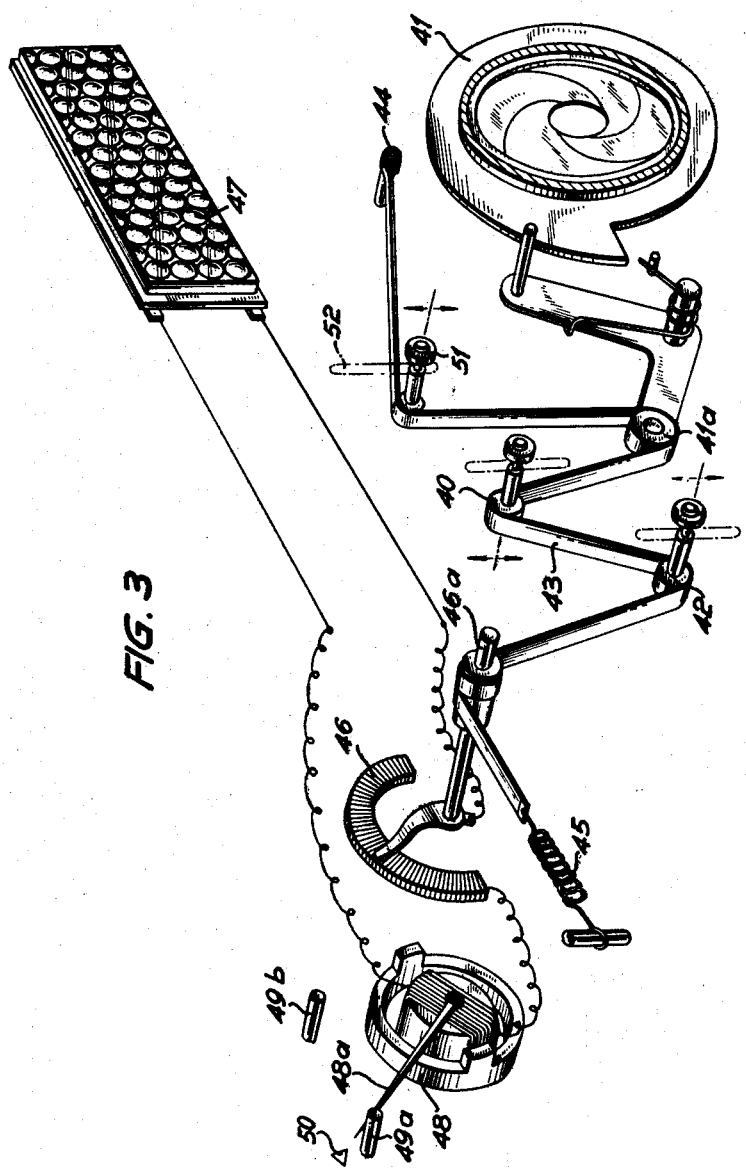

United States Patent Office 3,073,222
Patented Jan. 15, 1963

3,073,222
CAMERA WITH A BUILT-IN EXPOSURE METER
Heinrich Broschke, Wetzlar (Lahn), Germany, assignor to Ernst Leitz Gesellschaft mit beschränkter Haftung, Wetzlar (Lahn), Germany
Filed Feb. 27, 1961, Ser. No. 91,685
Claims priority, application Germany Feb. 27, 1960
11 Claims. (Cl. 95—10)

The present invention relates to a camera having a built-in exposure meter, more particularly, to photographic or motion-picture cameras having built-in exposure meters coupled to the several adjusting means in such a manner that the exposure meter has a plurality of measuring ranges.

The conventional camera has adjusting means for the shutter speed and the diaphragm opening and the conventional motion-picture camera has adjusting means for the film speed and frame frequency, the objective diaphragm opening and the width of the diaphragm sector.

It has been previously proposed to operatively connect the adjusting means on both photographic and motion-picture cameras through a differential gear to a pivotally mounted measuring mechanism of an exposure meter which has a plurality of measuring ranges. A releasable coupling or clutch is provided between the measuring mechanism and the differential gear for rotating the measuring mechanism through a constant angle during adjustment of the measuring range of the exposure meter. This rotation of the measuring mechanism is independent of the adjusting members. The rotation of the measuring mechanism while the coupling is released simultaneously adjusts the measuring range of the exposure meter.

In a known modification the measuring mechanism of an exposure meter is fixedly mounted and a rotatable structure which cooperates with the pointer of the measuring mechanism is connected to the several adjusting members of the camera by means of a flexible tape, rope or chain which interconnects the several adjusting members. Movement of any of the adjusting members causes a corresponding movement of the connecting tape and, accordingly, a rotation of the rotatable dial plate having measuring scales thereon.

The above-described structure for adjusting the measuring ranges of an exposure meter coupled to a camera requires an expensive and complicated structure in the form of the releasable coupling or clutch.

It is therefore the principal object of this invention to provide a novel and improved structure in a camera having a built-in exposure meter for adjusting the measuring ranges of the exposure meter independently of the adjusting means on the camera.

The present invention represents a substantial improvement of the flexible tape structure described above which has been used to interconnect the measuring means with the exposure meter. In the present invention the several adjusting members of the camera are interconnected by a flexible tape with either a pivotally mounted adjusting mechanism for an exposure meter or with a follow-up pointer of a stationary measuring mechanism. An additional adjusting member engages the tape so that actuation of this adjusting member moves the tape in its longitudinal direction and simultaneously modifies current generated by the light-responsive element of the exposure meter.

One end of the tape is connected with the pivotally mounted measuring mechanism or with a follow-up pointer so that longitudinal movement of the tape causes a rotation of the mechanism or the pointer, respectively. The additional adjusting member is also connected in a suitable manner so as to change the output of the current generated by the light-responsive element. This can be done by inserting a resistor into the electrical circuit of the exposure meter, by changing the area of the light-responsive element or by connecting filters in series in front of the responsive element of the exposure meter.

Other objects and advantages of this invention will become apparent upon reference to the accompanying description when taken in conjunction with the following drawings, wherein FIGURE 1 is a schematic view of a camera having a built-in exposure meter wherein the adjusting member is connected to one end of the tape and is also connected with a resistor in the electrical circuit of the exposure meter for varying the current output of the photoelectric cell;

FIGURE 2 is a schematic view of a modification of the element of a camera having a built-in exposure meter wherein the additional adjusting member acts upon the tape intermediate its two ends and the tape is connected with mechanism means for varying the output of the photoelectric cell;

FIGURE 3 is a schematic view of the components of a camera having a built-in exposure meter wherein the flexible tape is interconnected to a variable resistor in the electrical circuit of the exposure meter.

A specific embodiment of this invention and several modifications thereof will next be described with reference to the foregoing drawings wherein like reference symbols indicate the same parts throughout the various views.

Returning to FIGURE 1 there is shown a camera 1 which has an objective 2 and a direct view-finder comprising an objective 3a and an ocular or eyepiece 3b. The camera has an exposure meter built therein which comprises a photoelectric cell 4 and a pivotally mounted measuring mechanism 5. The measuring mechanism 5 is provided with a pin 19a to limit its angle of rotation between two stationary abutments 19c and 19b. Such pin-abutment arrangement is a conventional provision for limiting angular movements (see for example U.S. Patent 2,194,152, FIG. 1, element 94; French Patent 1,251,196, FIG. 4, elements 47, 48, 49 and 50; Austrian Patent 210,272, elements 22, 23, and 24). Measuring mechanism 5 has a pointer 6 which is positioned for movement in the range of the view finder and cooperates with a stationary index 7 mounted in this range.

The camera comprises an exposure time adjusting member 8 and a diaphragm opening adjusting member 9 which are interconnected by a flexible tape 10. The diaphragm adjusting member 9 is indirectly connected to the tape 10 by means of a pivotally mounted crank 18. One end of the crank 18a has a pin 18b which acts upon a cam plate 9a connected to the diaphragm opening mechanism. A spring 18c biasses the crank arm 18 into engagement with the cam plate 9a.

One end of the tape 10a is connected to a spring 11 which has one end fixedly mounted to the frame of the camera. The tape 10 drivingly engages a pulley 5a which, in turn, is drivingly connected to the measuring mechanism 5 so that movement of the tape will cause a pivoting movement of the measuring mechanism 5.

It is pointed out that various legs of the tape between the adjusting members and the several pulleys depicted in FIGURE 1 are not shown parallel but at angles with respect to each other. This would imply a non-linear division of the several focussing scales. These scales, however, could well be linear by so positioning the various components of the camera that the legs of the tape 10 are substantially parallel.

The other end of the tape 10, indicated at 12, is connected to an adjusting member 13, actuating of which will adjust the measuring range of the exposure meter. The adjusting means 13 is also interconnected with the electric circuit between the measuring mechanism and the photoelectric cell through stationary contacts 14a, 14b and 15a, 15b. The adjusting member 13 has connected thereto a structure which is essentially a moveable contact 13a. There is an electrical resistance 16 in this circuit between the contact 14b and the photoelectric cell 4. This resistance can be selectively connected into the circuit between the photoelectric cell and the measuring mechanism by actuating adjusting means 13 between the two pairs of stationary contacts.

Moveable contact 13a has to interconnect either contacts 14a–14b or contacts 15a–15b in order to establish electrical connection between photoelectric cell 4 and measuring mechanism 5. Thus, adjusting member 13 has to be either in an upper or in a lower position but not in an intermediate position, because in the latter case there would be no electric connection and thus no indicative deflection of pointer 6.

The tape 10 is also looped around another adjusting member 17 which is employed to compensate for the sensitivity of the film. Any other adjusting members for other exposure factors, such as filters, can be interconnected in the same manner by the flexible tape 10.

In the operation of the embodiment of the invention as illustrated in FIGURE 1 when light is received by the photoelectric cell 4 a certain voltage is delivered to the measuring mechanism 5 and, accordingly, the pointer 6 is deflected in clockwise direction by an amount commensurate with this voltage. This deflection will depend upon the intensity of illumination received by the photoelectric cell 4. By actuating the exposure time adjusting member 8 and the diaphragm opening adjusting member 9 the several loops of the tape 10 are either shortened or lengthened which correspondingly rotates the measuring mechanism 5. When the proper adjustments of the exposure time and the diaphragm opening have been made corresponding to the existing light conditions, the pointer thus will be returned to register with the stational index 7 by the pivoting movement of the measuring mechanism 5, providing the proper measuring scale of the exposure meter has been used.

If the pointer 6 by pivoting measuring mechanism 5 cannot be returned to register with index 7 due to the limitation of its angle of rotation, the adjusting member 13 must be actuated, thus switching the exposure meter to its other measuring range. Actuation of the member 13 will either connect or disconnect resistance 16 from the electric circuit of the exposure meter and accordingly the voltage delivered to the measuring mechanism will be correspondingly varied by a predetermined constant amount. Since the adjusting members 8 and 9 remain unchanged, the actuation of the adjusting member 13 will move the tape longitudinally to pivot the measuring mechanism by the constant angle of rotation taken between the abutments 19b and 19c. At the same time the increased or decreased voltage, delivered to the measuring mechanism by the photo cell, will cause either an increase or a decrease of the pointers deflection. Both movements, i.e. that of measuring mechanism 5 and that of pointer 6 are through similar angles but carried out in opposite direction, so that pointer 6 after actuation of member 13 has the same relative position with respect to index 7 as it has occupied before the actuation of member 13. However, by actuating the setting means of the diaphragm 9 and of the exposure time 8 in proper direction, measuring mechanism 5 may again be rotated, thus facilitating pointer 6 to be caused to register with index 7.

Proceeding next to FIGURE 2 a modification of this invention will be described. In this modification the connection to the diaphragm opening is indicated at 20 and the connection to the exposure time is indicated at 21. Both of these adjusting members are coupled by a flexible tape 22 to a follow-up pointer 23 of the exposure meter which has a stationary measuring mechanism 24 and a photoelectric cell 25. One end 22a of the flexible tape is fixedly connected to the camera casing by a pin 26.

The other end 22b of the tape is wound around a pulley 23b which is connected through gears to the follow-up pointer 23 which pivots about an axis or shaft 23a. The extreme end of the tape at 22b is connected by a spring 27 to the casing of the camera. A film-sensitivity adjusting member 28 and an adjusting member 29 for the measuring range of the exposure meter are also interconnected to the flexible tape 22. The adjusting member 29 moves within a slot 29a by a constant amount so as to either shorten or lengthen the tape 22 between the pulley 23b and the pin 26.

It has to be observed during operation, that adjusting member 29 is only in the uppermost or the lowest position in slot 29a so that tape 22a is moved by a constant amount.

The adjusting member 29 is connected to a toothed rack 30 which meshes with a pinion gear 31. The gear 31 is fixedly connected with a shutter 32 which is rotatable through an angle of about 90° and which is positioned at the front surface of the photoelectric cell 25 so as to vary the illumination received by the photoelectric cell.

When the adjusting member 29 is moved a distance corresponding to the length of the slot 29a the tape 22 will either be lengthened or shortened between the pin 26 and the pulley 23b. This varying of the tape length will move the tape in a longitudinal direction and accordingly the follow-up pointer 23 will be pivoted through a constant angle which may be indicated as α. Simultaneously with the movement of the adjusting member 29 the shutter will be actuated to vary the intensity of light received by the photoelectric cell 25. Accordingly, the voltage delivered to the measuring mechanism by the photoelectric cell will either be increased or decreased by a predetermined constant amount. The amount of the voltage increase or decrease will determine the angle α through which the follow-up pointed pivots during the adjustment of the measuring range of the exposure meter.

In the modification of FIGURE 3 the exposure time adjusting member is indicated at 40 and the diaphragm adjusting structure is indicated 41. The connection for the diaphragm with a tape is indicated at 41a. There is a film-sensitivity adjusting member 42 with all of these adjusting members being interconnected by a tape 43 which is looped upon the adjusting members. One end of the tape is fixedly connected to the camera casing by a pin 44 and the other end is connected to the camera casing through a spring 45.

There is a variable electrical resistance 46 which is engaged by a contact arm mounted on a shaft 46a upon which the tape 43 is also looped. The resistance 46 and the moveable contact arm are connected into the electrical circuit interconnecting between a photoelectric cell 47 and a stationary measuring mechanism 48 of the exposure meter. This measuring mechanism has a pointer 48a which is moveable between abutments 49a and 49b and cooperates with a stationary index 50.

The adjusting member for varying the measuring range of the exposure meter is indicated at 51 and engages the tape between the ends thereof. The adjusting member 51 is moveable within a slot 52 so that movement thereof will change the length of the tape between the shaft 46a and the pin 44. Accordingly, the tape 43 will move longitudinally to rotate the moveable contact arm and to modify the variable resistance in the circuit of the exposure meter by a predetermined and constant amount. Member 51 has only two operating positions for correct operation, the uppermost and the lowest position in slot 52. Moving of member 51 between these operating positions ensures that upon a change in range a predetermined amount of resistance taken from resistance 46 is inserted into or is removed from the electrical connection between photo cell 47 and measuring mechanism 48.

In a manner similar to that described above the camera is adjusted for prevailing light conditions according to the exposure meter by adjusting the exposure time and the diaphragm opening. The camera will be correctly adjusted for these light conditions after the pointer 48a corresponds with the stationary index 50. This correspondence will be achieved by actuating the setting means for exposure time 40 and diaphragm 42 and thus adjusting the variable resistance 46.

Thus, the adjusting means for varying the measuring range of the exposure meter performs the double function:

(1) Modifying the current generated by the photoelectric cell, and (2) Effecting a corresponding movement in the measuring mechanism or the pointer commensurate with the varying of the electrical current.

This double function is also performed in the modification of FIGURE 3 since the pointer 48a is automatically moved as the current generated by the photoelectric cell is modified.

It will be understood that this invention is susceptible to modifications in order to adapt it to different usages and conditions and, accordingly, it is desired to comprehend such modifications within this invention as may fall within the scope of the appended claims.

What I claim is:

1. In a camera, an exposure meter having a plurality of measuring ranges and operatively coupled to the camera, said exposure meter having a measuring mechanism and a photoelectric cell connected thereto, there being a movable pointer on said measuring mechanism, said exposure meter further having a stationary index for cooperation with said movable pointer, means on said camera for adjusting the exposure time and diaphragm speed, a variable resistance in the connection between said photoelectric cell and said measuring mechanism, a flexible tape operatively connecting said adjusting means for said exposure time and diaphragm speed with said variable resistance so that movement of said adjusting means will adjust said resistance, and means operatively coupled to said tape for adjusting the measuring range of said exposure meter so that actuation of said means will move said tape lengthwise to adjust said variable resistance and thereby the current energizing said measuring mechanism.

2. In a camera, the combination comprising: an exposure meter including a photoelectric cell, a measuring mechanism with a movable indicator electrically connected to said cell for deflection of said indicator in response to the current of said cell, and a sensitivity adjustment means operatively connected to said cell for altering the sensitivity of said meter so as to establish two measuring ranges, means on said camera for adjusting the exposure time and diaphragm means of said camera; a flexible tape in operative connection with said adjusting means and moving lengthwise in accordance with adjustment of said adjusting means; means for operatively coupling individually said mechanism and said sensitivity adjustment means of said meter to said tape for transmitting movement of said tape to said indicator; and a two-position adjustment member connected to said tape and to said sensitivity adjustment means for moving said tape lengthwise for a predetermined distance thereby altering concurrently meter sensitivity and selecting one among the said two ranges.

3. In a camera the combination comprising: an exposure meter including a photocell, a measuring mechanism with a deflectable indicator electrically connected to said cell, for deflection of said indicator in response to the photoelectric current of said cell, an adjustable means for altering said photoelectric current as produced in said cell by a fixed value so as to establish two measuring ranges of said meter, means on said camera for adjusting the exposure time and diaphragm means, a flexible tape in operative connection with said adjusting means and moving lengthwise in accordance with adjustment thereof; means for operatively coupling said measuring mechanism to said tape for transmitting movement thereof upon the indicator; and a two position adjustment means operatively connected to said tape and to said adjustable means for moving said tape lengthwise for a pre-determined distance and simultaneously altering the position of said adjustable means so as to select one among said two ranges.

4. In a camera, the combination comprising: an exposure meter including a photocell, a measuring mechanism including a pivotable indicator electrically connected to said cell and for deflection of said indicator in response to the photoelectric current of said cell, and adjustable means for altering said photoelectric current from said cell by a fixed amount so as to establish two measuring ranges of said meter, means on said camera for adjusting the exposure time and diaphragm means thereof, a flexible tape in operative connection with said adjusting means and moving lengthwise in accordance with adjustment thereof; means for operatively coupling said measuring mechanism to said tape for transmitting movement thereof upon the indicator; and a two-position adjustment member operatively connected to said tape and to said adjustable means for simultaneously moving said tape lengthwise for a predetermined distance and altering the position of said adjustable means whereby said pointer is subjected to two oppositely directed angular deflections.

5. In a camera the combination comprising: an exposure meter including a photocell, a pivotable measuring mechanism including a movable indicator for deflection of said indicator in response to the photoelectric current of said cell, electric circuit means including a resistor and a switch for selectively connecting said mechanism to said cell with and without said resistor as series resistance; means on said camera for adjusting the exposure time and diaphragm means, a flexible tape in operative connection with said adjusting means and moving lengthwise in accordance with the adjustment thereof, means for operatively connecting said tape to said mechanism for transmitting tape movement as pivot motion to said mechanism; and a two-position adjustment means connected to said tape and to said switch for moving said tape lengthwise for a predetermined distance without altering said adjusting means and simultaneously altering the selective position of said switch.

6. In a camera, the combination comprising: an exposure meter including a photoelectric cell, an adjustable shutter mounted adjacent photoelectric cell for altering the amount of light permitted to effect the photoelectric cell so as to establish two measuring ranges and to adjust the sensitivity of the meter accordingly, said meter further including a measuring mechanism electrically connected to said cell and including a mechanically and electrically pivotable pointer; means on said camera for adjusting the exposure time and diaphragm means, a flexible tape in operative connection with said adjusting means and moving lengthwise in accordance with adjustment thereon; means for connecting said tape to said adjustable shutter including an adjustment member for actuating said adjustable shutter thereby moving said tape lengthwise for a predetermined amount without effecting said adjusting means; and means for connecting said tape to said mechanism for transmitting any tape movement as pivot motion upon said pointer.

7. In a camera, the combination comprising: an exposure meter including a photoelectric cell, a measuring mechanism including a deflectable pointer, a variable resistor and connection means for interconnecting said mechanism and said cell for deflecting said pointer in response to the photocell current; means on said camera for adjusting the exposure time and diaphragm means; a flexible tape in operative connection with said adjusting means and moving lengthwise in accordance with adjustment thereof; means for operatively connecting said tape to said variable resistor so as to transmit tape movement thereupon whereby said resistor is varied; and an adjustment member connected to said tape for moving said tape without effecting said adjusting means, whereby the photocell circuit is altered by a corresponding amount of resistance causing a predetermined amount of pointer movement.

8. In a photographic camera the combination comprising: an exposure meter including a photoelectric cell, a measuring mechanism with movable light intensity indicator, electrically connected to said cell for deflection of said indicator in response to the photoelectric current of said cell and a sensitivity adjustable means operatively connected to said cell for altering the sensitivity of said meter, means of said camera for adjusting the exposure time and diaphragm means, a flexible tape in operative connection with said adjusting means and moving lengthwise in accordance with the adjustment therof; means for operatively coupling said measuring mechanism to said tape for transmitting movement thereof upon said indicator; and a two-position adjustment means connected to one end of said tape and operatively connected to said adjustable means for simultaneously moving said tape lengthwise for a predetermined distance and concurrently actuating said adjustable means for adjusting the sensitivity of said meter.

9. In a photographic camera the combination comprising: an exposure meter including a photoelectric cell, a measuring mechanism with movable light intensity indicator, electrically connected to said cell for deflection of said indicator in response to the photoelectric current of said cell and a sensitivity adjustable means operatively connected to said cell for altering the sensitivity of said meter, means of said camera for adjusting the exposure time and diaphragm means, a flexible tape in operative connection with said adjusting means and moving lengthwise in accordance with the adjustment thereof, said tape being resiliently connected to stationary support means in said camera; means for operatively coupling said measuring mechanism to said tape for transmitting movement thereof upon said indicator; and a two-position adjustment means engaging said tape and being operatively connected to said adjustable means for simultaneously moving said tape lengthwise for a predetermined distance and actuating said adjustable means for changing the sensitivity of said meter.

10. In a camera, an exposure meter operatively coupled to the camera, said exposure meter having a mechanically pivotally mounted measuring mechanism co-operating with an electrically pivotable pointer, further having a photoelectric cell connected thereto, so that the photoelectric current causes said pointer to deflect; means on said camera for adjusting the exposure time and diaphragm speed; a flexible tape operatively connecting said adjusting means for said exposure time and diaphragm speed with said pivotable measuring mechanism so that movement of said adjusting means will pivot said mechanism with pointer; adjusting means operatively coupled to said tape so that actuation of said means will move said tape lengthwise by a constant amount and also pivot said measuring mechanism by a constant angle; and means operatively connected to said adjusting means for concurrent actuation for adjusting the current generated by said photoelectric cell by an amount effective as pivot motion for said pointer at an angular direction opposite to the direction of pivoting said mechanism upon actuation of said adjusting means.

11. In a camera, an exposure meter operatively coupled to the camera, said exposure meter having a stationary measuring mechanism having an electrically and mechanically pivoting follow-up pointer; means on said camera for adjusting the exposure time and diaphragm speed; a flexible tape operatively connecting said adjusting means for said exposure time and diaphragm speed with said follow-up pointer so that movement of said adjusting means will pivot mechanically said follow-up pointer of said exposure meter; range adjustment means operatively coupled to said tape so that actuation of said means will move said tape lengthwise by a constant distance to pivot said pointer accordingly; and means actuated by said range adjustment means for adjusting the current generated by the photoelectric cell of said exposure meter to pivot said follow-up pointer oppositely to pivot motion of the concurrently adjusted tape.

References Cited in the file of this patent

UNITED STATES PATENTS

| | | |
|---|---|---|
| 2,150,365 | Dziewior | Mar. 14, 1939 |
| 2,256,208 | Leitz | Sept. 16, 1941 |
| 2,285,761 | Tonnies | June 9, 1942 |
| 2,379,102 | Rath | June 26, 1945 |
| 2,387,466 | Rath | Oct. 23, 1945 |
| 2,521,093 | Rath | Sept. 5, 1950 |
| 2,983,206 | Singer | May 9, 1961 |